June 7, 1960  B. T. O'SHAUGHNESSY, JR  2,939,729
QUICK DISCONNECT COUPLING
Filed April 9, 1958  2 Sheets-Sheet 1

*INVENTOR.*
BERNARD T. O'SHAUGHNESSY JR.
BY
Teller & McCormick
ATTORNEYS

June 7, 1960     B. T. O'SHAUGHNESSY, JR     2,939,729
QUICK DISCONNECT COUPLING Filed April 9, 1958     2 Sheets-Sheet 2

*INVENTOR.*
BERNARD T. O'SHAUGHNESSY JR.
BY
Teller & McCormick
ATTORNEYS

United States Patent Office 2,939,729
Patented June 7, 1960

2,939,729

QUICK DISCONNECT COUPLING

Bernard T. O'Shaughnessy, Jr., Suffield, Conn., assignor to The Preferred Engineering and Research Corporation, Suffield, Conn., a corporation of Connecticut Filed Apr. 9, 1958, Ser. No. 727,371

4 Claims. (Cl. 285—315)

This invention relates to a quick disconnect coupling which can be used to particular advantage in connecting adjacent ends of conduit elements such as hose and pipes or the like and which may be used whether the conduit is subjected to a vacuum or to pressure.

It is the general object of the invention to provide a coupling of the aforementioned type which is of particularly sturdy but simple construction and which will provide a locked and sealed connection between the conduit elements when engaged or coupled but which can easily and simply be manually disengaged and re-engaged.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
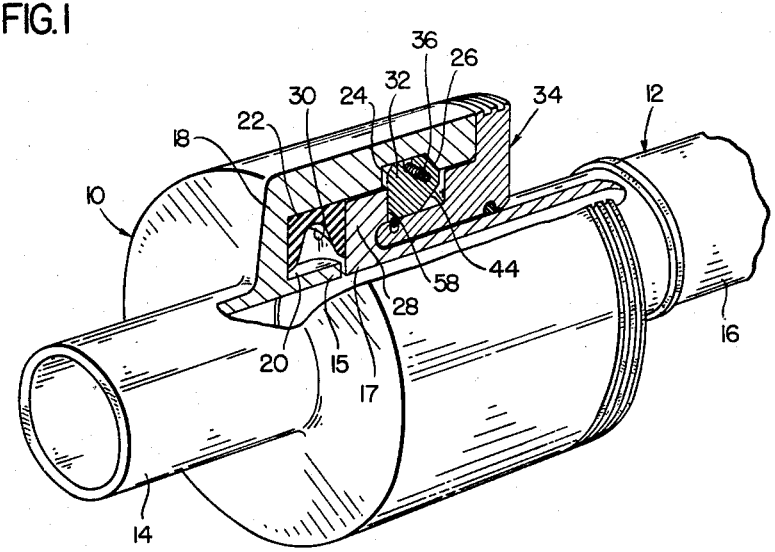
Fig. 1 is a perspective view, partially in section, of a coupling provided in accordance with the present invention and showing the elements thereof in engaged or coupled condition.

The major elements of the coupling provided in accordance with the present invention may be formed integrally on the ends of the conduits or other members which are to be connected together, or they may be formed independently of the conduits and connected thereto in some manner or by means forming no part of the present invention. For convenience, the said major elements of the coupling may be referred to as a female coupling member 10, and a male coupling member 12. Each of the said coupling members has a tubular portion, respectively designated by the reference numerals 14 and 16, which in each instance may constitute an integral part or end portion of the two conduits which are to be connected together, or the said tubular sections may be connected to the conduits or conduit sections as desired.

Referring now to the female member 10, it will be observed that adjacent the connecting end 15 of its tubular portion 14, but spaced therefrom, the said female member is provided with a diametrically enlarged forwardly projecting portion 18 which extends well beyond the said connecting end. The said extension 18 is counterbored on a diameter substantially greater than the diameter of the tubular section 14 and the counterbore is sufficiently deep to provide an annular cavity 20 around the connecting end 15. The annular cavity 20 is provided to accommodate a seal such as the seal 22 which will be described in greater detail hereinafter. It is important to observe that a radially inwardly facing annular groove 24 is cut in the wall of the extension 18 from the bore thereof to accommodate the locking means of this coupling. The groove 24 is disposed forwardly of the connecting end 15 and the front wall 26 of the said groove slopes or is tapered so as to be inclined rearwardly from its radially inner edge to its radially outer edge. The inclined wall 26 is provided to engage a complementary inclined surface on the segments of the locking ring as will be described hereinafter.

Figure 2:
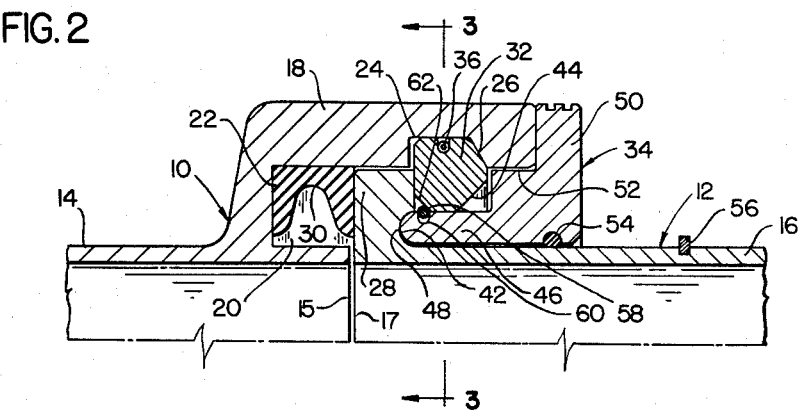
Fig. 2 is a fragmentary longitudinal sectional view through the engaged coupling.

Turning now to the male coupling member 12, it will be observed that a radially outwardly extending flange 28 is provided thereon at its connecting end 17. The flange 28 is slightly less in diameter than the bore of the female extension 18 so as to provide for a free sliding fit of the flange and male member within the said bore. As best shown in Figs. 1 and 2, the radial flange 28 engages the seal member 22 disposed within the annular cavity 20 in the female member 10.

A preferred seal member for use when the conduits to be connected are subjected to pressure is one having a groove 30 therein so as to define a pair of radially inwardly projecting annular lips on the seal member. Thus, fluid pressure within the coupling and interconnected conduits reaching the said groove 30 of the seal member tends to spread the said lips to enhance the sealing. It will be observed that the seal member 22 is provided in such size that it will extend forwardly of the connecting end 15 of the female member so that the flange 28 on the male member can engage the seal in the connected condition of the coupling without engaging or butting against the said connecting end of the female member.

Figure 3:
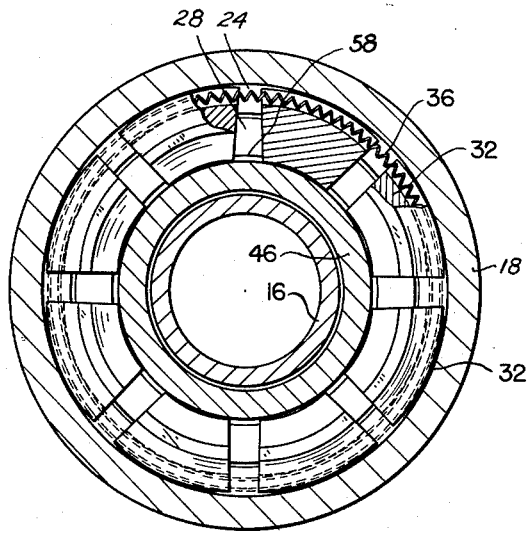
Fig. 3 is a transverse sectional view through the engaged coupling taken as indicated by the line 3—3 of Fig. 2.
Figure 4:
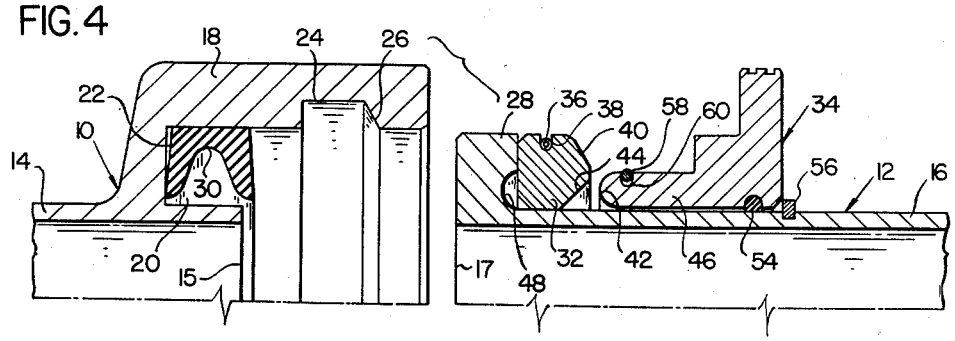
Fig. 4 is a view similar to Fig. 2 but showing the coupling elements disengaged and separated.
Figure 5:
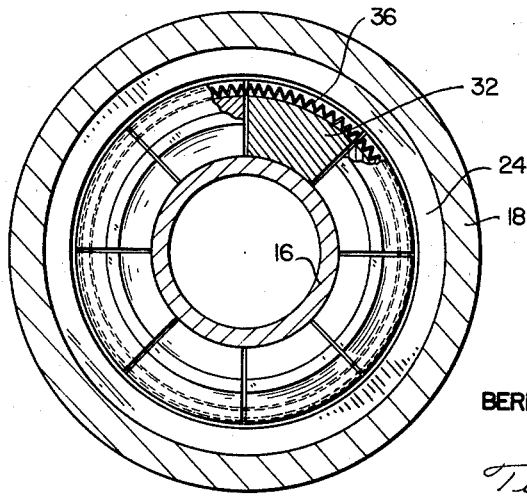
Fig. 5 is a transverse sectional view similar to Fig. 3, but showing the segmental locking ring contracted.

As shown in Fig. 4, the male coupling member 12 carries with it a locking ring comprising a plurality of segments 32, 32 and it also carries an expanding sleeve indicated generally by the reference numeral 34. The said segmental locking ring is carried by the male member rearwardly of its flange 18 and it is adapted to be expanded or shifted radially outwardly so that the segments 32, 32 thereof can be engaged within the annular grove 24 provided in the forward extension 18 of the female member 10. A coil spring 36 having its ends connected as by welding or the like to form a circle is used to retain the ring segments 32, 32 in ring form, the said circular spring being received within a groove 38 provided in the outer surface of each of the said segments. Thus, when the segmental locking ring is expanded, the spring 36 accommodates sliding movement of the segments relative to each other to the position shown in Fig. 3. When the means for expanding the segmental ring is removed, the spring 36 contracts the segments 32, 32 into or near engagement with each other and into engagement with the tubular section 16 as shown in Fig. 5. In their contracted positions, the ring segments 32, 32 are arranged to permit insertion of the same within the bore of the extension 18 of the female member and may be said to lie substantially within the peripheral outline of the outside of the flange 28. That is, the outer surfaces of said segments approximately register with or may be disposed slightly inwardly or slightly outwardly in a radial direction from the peripheral surface of said flange.

Radial expansion and contraction of the segmental ring is accommodated by movement of the segments thereof along the back surface of the flange 18 which is the surface thereof farthest removed from the connecting end 17 of the male member 12. As previously mentioned, expansion of the segmental ring engages the segments 32, 32 within the annular groove 24 in the bore of the extension on the female member. To facilitate such engagement, each ring segment 32 is provided with a tapered surface 40 complementary to and engageable with tapered surface 26 in the said groove. It will be observed that the inclination of the complementary tapered surfaces is such as to assist engagement of the ring segments within the annular groove when the said ring is being expanded and when the male member 12 is thrust into the extension 18 on the female member.

The sleeve 34 is the element provided in accordance with the present invention for expanding the segmental locking ring so as to engage the same within the groove 24 on the female member 10 to effect a coupling between the said female member and the male member 12. As best shown in Figs. 2 and 4, the front end or nose 42 of the sleeve 34 is formed to define a camming surface which is generally complementary and engageable with an inclined surface 44 on each locking ring segment 32 so as to force the segment radially outwardly along the flange 18 of the male member 12. Thus, the locking ring is expanded by moving the sleeve 34 forwardly or toward the locking end 17 of the male member and, in moving forwardly a substantially cylindrical front portion 46 of the said sleeve is thrust under the segments 32, 32 of the locking ring and the surface 42 of the said sleeve is thrust into a complementary groove 48 defined in the rear surface of the flange 18 on the male member. When the sleeve 34 is thrust forwardly to its limit as shown in Fig. 2, the diametrically greater or rear portion 50 of the said sleeve engages the end of the forwardly projecting extension 18 on the female member and an intermediate portion 52 of the said sleeve fits within the bore of the extension 18. An O-ring seal 54 is provided in a suitable internal groove in the sleeve 34 to prevent the ingress of dirt or other foreign material between the said sleeve and the tubular section 16 of the male member 12. A split ring stop 56 is located in a groove on the said tubular section 16 to limit the distance that the sleeve 34 can be retracted and to prevent inadvertent removal thereof.

In further accord with the present invention, means are provided to prevent the sleeve 34 from inadvertently slipping along the male member 12 or from being retracted inadvertently after it has been thrust forwardly to engage the locking ring within the groove on the female member. Such means in preferred form comprises a split ring 58 which is spring tempered to expand but which is carried within an annular groove 60 defined in the outer surface of the diametrically reduced portion 46 of the said sleeve. When the sleeve is deliberately advanced to expand the locking ring, spring ring 58 engages the tapered surface 44 on each segment of the locking ring and it is thrust wholly within its groove 60 to permit passage of the reduced diameter portion 46 of the sleeve under the ring segments. When the sleeve has been fully advanced to the position shown in Fig. 2, the spring ring 58 will expand into engagement with another tapered surface 62 on the forward end of each segment of the locking ring. When engaged with the surface 62, the spring ring 58 will be disposed partially within and partially without the groove 60. The engagement of the spring ring 58 with the inclined surface 62 will prevent inadvertent or undesired retraction of the expanding sleeve 34, but it will not prevent deliberate retraction thereof by the application of manual force.

Thus, when the coupling is connected as shown in Figs. 1 and 2, the flanged end of the male member will engage the seal member 22 within the bore of the female member to provide a sealed connection, and the expanding sleeve 34 will be positioned to thrust the segments of the locking ring into the annular groove 24 in the female member and the said expanding sleeve cannot be inadvertently retracted so as to permit inadvertent uncoupling or disengagement. When in the coupled condition, no force within the material strength limits of the male and female members when applied to them can cause them to be disconnected or uncoupled. That is, any force applied to the coupling members 10 and 12 longitudinally thereof and tending to separate them will be ineffective to cause their separation because of the disposition of the segmental locking ring within the groove 24. Such force when applied to the major coupling elements will merely cause a shearing stress to be applied across each segment 32 of the locking ring and will, in fact, cause the segments to be cammed radially into binding engagement with the sleeve 34 and prevent inadvertent or accidental withdrawal of the sleeve. The locking ring segments are provided to withstand shearing stress to prevent breakage of the coupling in any application thereof anticipated.

While the coupling has been shown and described as used in connection with conduits subjected to fluid pressure, it will be understood that the same coupling construction can be used if the conduits are subjected to vacuum. In effecting a vacuum connection, another seal member is substituted for the seal member shown. The preferred seal member for vacuum application has a groove provided in its radially outer surface so that the lips thereof will tend to expand and enhance the seal in the presence of a vacuum condition within the conduits and coupling members.

It will be understood that various other changes can be made within the scope of the invention as defined in the claims.

The invention claimed is:

1. A quick disconnect device comprising a female member including a tubular section and an extension projecting beyond an end of the tubular section and having an enlarged bore provided with a annular radially inwardly facing groove therein, a male member having a radially outwardly extending flange on one end which is slidable within the bore, an expansible locking ring carried on the male member adjacent the said flange and spring tensioned to lie substantially within the peripheral outline of the outside of said flange, and a sleeve slidable on the male member into and out of engagement with the ring when the male member is inserted in the bore of the female member, the sleeve being engageable with the ring to expand the ring radially outwardly and to support the ring partly in the groove of the female member but with a portion of the ring engaging the flange on the male member to prevent withdrawal of the male member from the bore of the female member, the ring and sleeve having camming surfaces which provide for movement of the ring outwardly along the said groove and which provide for movement of a substantially cylindrical portion of the said sleeve under the ring when the sleeve is moved into engagement with the ring and toward the said flange, and the ring and the groove in said tubular section having complementary surfaces which serve to urge the ring radially inwardly into binding engagement with said substantially cylindrical sleeve portion when said male and female members are subjected to forces tending to disconnect the same.

2. A quick disconnect device as set forth in claim 1 wherein the locking ring comprises a plurality of segments each of which has a groove in its outer surface and also comprises a circular spring connecting the segments and located within their grooves to provide for ring expansion and contraction.

3. A quick disconnect device as set forth in claim 1 wherein locking means is carried on said slidable sleeve to engage said expansible locking ring when said sleeve and ring are engaged to prevent inadvertent movement of said cylindrical portion of the sleeve from under the ring.

4. A quick disconnect device as set forth in claim 3 wherein said cylindrical sleeve portion is provided with a radially outwardly facing groove and wherein said locking means comprises a split ring carried in said groove for expansion into engagement with a generally forwardly facing surface on said ring when the ring is expanded.

References Cited in the file of this patent

UNITED STATES PATENTS

| | | |
|---|---|---|
| 1,587,079 | Machino | June 1, 1926 |
| 1,734,236 | Smith et al. | Nov. 5, 1929 |
| 2,111,956 | Baldwin | Mar. 22, 1938 |
| 2,127,086 | McGrath | Aug. 16, 1938 |
| 2,248,269 | Bilde | July 8, 1941 |
| 2,701,147 | Summerville | Feb. 1, 1955 |
| 2,702,200 | Fukuyama | Feb. 15, 1955 |
| 2,733,938 | Davis | Feb. 7, 1956 |